(12) United States Patent  
Gross et al.

(10) Patent No.: US 9,395,507 B1
(45) Date of Patent: Jul. 19, 2016

(54) UNIVERSAL FIBER OPTIC MOUNTING MODULE

(71) Applicant: All Systems Broadband, Inc., Livermore, CA (US)

(72) Inventors: Donald James Gross, Raleigh, NC (US); Timothy W. Dexter, Kent, WA (US)

(73) Assignee: All Systems Broadband, Inc., Livermore, CA (US)

( * ) Notice: Subject to any disclaimer, the term of this patent is extended or adjusted under 35 U.S.C. 154(b) by 0 days.

(21) Appl. No.: 14/741,803

(22) Filed: Jun. 17, 2015

(51) Int. Cl.
*G02B 6/00* (2006.01)
*G02B 6/44* (2006.01)

(52) U.S. Cl.
CPC .................... *G02B 6/4446* (2013.01)

(58) Field of Classification Search
CPC .................................................. G02B 6/4446
See application file for complete search history.

(56) References Cited

U.S. PATENT DOCUMENTS

| 8,886,003 B2 * | 11/2014 | Nieves | G02B 6/4452 385/134 |
| 2009/0290842 A1 * | 11/2009 | Bran de Leon | G02B 6/4455 385/135 |
| 2012/0106911 A1 * | 5/2012 | Cooke | G02B 6/4452 385/135 |

* cited by examiner

*Primary Examiner* — Uyen Chau N Le
*Assistant Examiner* — Chad Smith
(74) *Attorney, Agent, or Firm* — Murphy, Bilak & Homiller, PLLC

(57) ABSTRACT

A fiber optic hardware module includes an enclosure including a planar floor section, outer sidewalls adjoining the floor section and extending from the floor section to top edges, and a detachable top panel that covers an interior volume that is defined by the outer sidewalls and the floor section. Fiber optic cable ports are disposed on a first outer sidewall and feed into the interior volume. First and second mounting tabs are configured to secure the fiber optic hardware module to a planar surface that is flush against the floor section. A third mounting tab is configured to secure the fiber optic hardware module to a planar surface that is flush against the top panel. The third mounting tab is vertically offset from the first and second mounting tabs. The third mounting tab is laterally between the first and second mounting tabs.

18 Claims, 8 Drawing Sheets

UNIVERSAL FIBER OPTIC MOUNTING MODULE

TECHNICAL FIELD

The present invention generally relates to fiber optical networks, and particularly relates to devices for mounting and storing fiber optic hardware such as passive optical circuits.

BACKGROUND

Today's communication networks provide transport of voice, video and data to both residential and commercial customers, with more and more of those customers being connected by fiber optic cables. In these communication networks, information is transmitted from one location to another by sending pulses of light through the fiber optic cables. Fiber optic transmission provides several advantages over electrical transmission techniques, such as increased bandwidth over distance with lower losses and maintenance.

Delivery of fiber optic communication services from a service provider to a customer is effectuated by interfacing service provider cabling with customer cabling at one or more termination points. At a termination point, a variety of techniques may be used to connect the service provider cabling with customer cabling, including manual splicing as well as using standardized connectors.

Different types of fiber optic hardware may be used at termination points to store and secure fiber optic cabling and optical circuitry. One example of a fiber optic hardware storage structure is a telecommunications equipment rack. A telecommunications equipment rack includes a frame for mounting fiber optic shelves. Each shelf may have a sliding drawer configuration such that fiber optic equipment including cabling and circuits may be stored within the drawer. Another kind of fiber optic hardware storage structure is a fiber optic cassette shelf. A fiber optic cassette shelf includes mounting rails that accommodate a number of fiber optic cassettes, which in turn accommodate a number of fiber optic terminations, in an organized fashion. Fiber optic cassette shelves are typically tailored to the dimensions of a particular fiber optic cassette.

One important design consideration for fiber optic hardware is space efficiency. The number of fiber optic cables and associated optical circuitry continues to increase in response to the need for increased bandwidth. In many instances, there are significant space constraints at the termination points of fiber optic networks. The lack of compatibility of fiber optic hardware used in termination points can detrimentally impact space efficiency. For example, a fiber optic cassette or optical circuit module may be designed with a particular cassette shelf or equipment rack in mind. Incompatible fiber optic hardware structures may not work together at all, or may only be used at reduced spaced efficiency. Further, it may be impractical or expensive for an installer to keep every kind of fiber optic hardware structure in an inventory.

SUMMARY

A fiber optic hardware module is disclosed. According to an embodiment, the fiber optic hardware module includes an enclosure. The enclosure includes a substantially planar floor section, outer sidewalls adjoining the floor section and extending away from the floor section to top edges, and a detachable top panel that covers an interior volume, the interior volume being defined by the outer sidewalls and the floor section. The fiber optic hardware module further includes fiber optic cable ports disposed on a first one of the outer sidewalls and feeding into the interior volume. The fiber optic hardware module further includes first, second and third mounting tabs extending away from a second one of the outer sidewalls. The first and second mounting tabs are each configured to receive a fastener and secure the fiber optic hardware module to a planar surface that is flush against the floor section. The third mounting tab is configured to receive a fastener and secure the fiber optic hardware module to a planar surface that is flush against the top panel. The third mounting tab is vertically offset from the first and second mounting tabs. The third mounting tab is laterally between the first and second mounting tabs.

An assembly is disclosed. According to an embodiment, the assembly includes a first fiber optic hardware module. The first fiber optic hardware module includes an enclosure, including a substantially planar floor section, outer sidewalls adjoining the floor section and extending away from the floor section to top edges, and a detachable top panel that is fixedly attached to the top edges of the outer sidewalls and covers an interior volume defined by the outer sidewalls and the floor section. The first fiber optic hardware module further includes fiber optic cable ports disposed on a first one of the outer sidewalls and feeding into the interior volume. The first fiber optic hardware module further includes first, second and third mounting tabs extending away from a second one of the outer sidewalls. The third mounting tab is vertically offset from the first and second mounting tabs. The third mounting tab is laterally between the first and second mounting tabs. The assembly further includes a second fiber optic hardware device including a planar mounting surface. The first fiber optic hardware module is flush against the planar mounting surface of the second fiber optic hardware device. The second fiber optic hardware device is secured to the first fiber optic hardware module at one of the first, second and third mounting tabs.

BRIEF DESCRIPTION OF THE DRAWINGS

FIGS. 1A-1B, depicts a fiber optic hardware module, according to an embodiment. FIG. 1A depicts a diagonal view of the fiber optic hardware module with the roof section detached, and FIG. 1B depicts a diagonal view of the fiber optic hardware module with the roof section attached, according to an embodiment.

DETAILED DESCRIPTION

Embodiments described herein include a fiber optic hardware module that is compatible with a wide variety of fiber optic storage structures that are used at a termination point. The fiber optic hardware module is configured to enclose an interior volume such that one or more optical circuits can be stored within the interior volume. The module further includes fiber optic cable ports that allow fiber optic cables to be connected with the optical circuits within the interior volume.

The fiber optic hardware module includes mounting tabs that are advantageously configured for compatibility with various fiber optic structures. The mounting tabs provide compatibility by virtue of the dimensioning and arrangement of fastener perforations that are disposed on the mounting tabs. Some of the fastener perforations are elongated such that a circular fastener such as a screw can be inserted through the fastener perforation at varying locations. This provides flexibility in regards to the adaptability of the fiber optic hardware module to other devices.

The mounting tabs are advantageously configured to allow multiple ones of the fiber optic hardware modules to be stacked on top of one another in a staggered configuration. The mounting tabs are vertically offset such that, in a stacked configuration, an upper mounting tab of a lower fiber optic hardware module is closely arranged and may be flush against a lower mounting tab of an upper fiber optic hardware module. The dimensioning and arrangement of the fastener perforations on the mounting tabs allows a circular fastener, such as a screw, to be inserted through two mounting tabs with the two modules being laterally offset from one another. This staggered configuration allows an installer to use multiple fiber optic hardware modules to store a number of connected optical circuits while easily accessing the fiber optic ports for each fiber optic hardware module.

Figure 1:
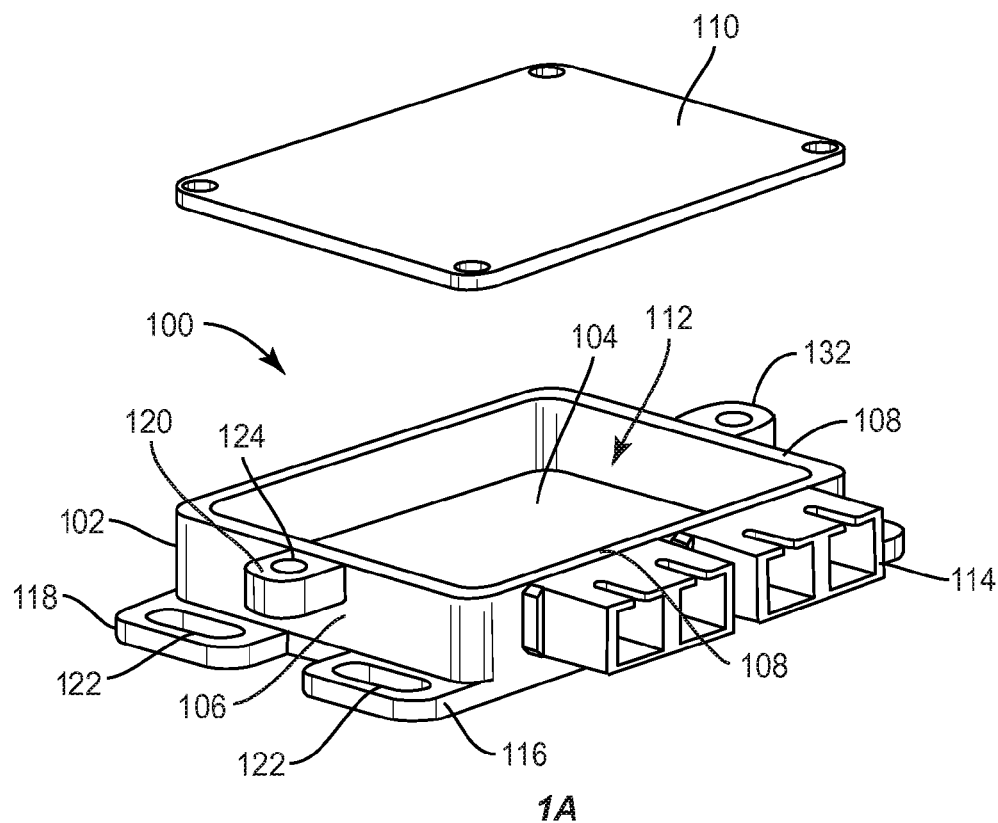
FIG. 1, which includes
Figure 1:
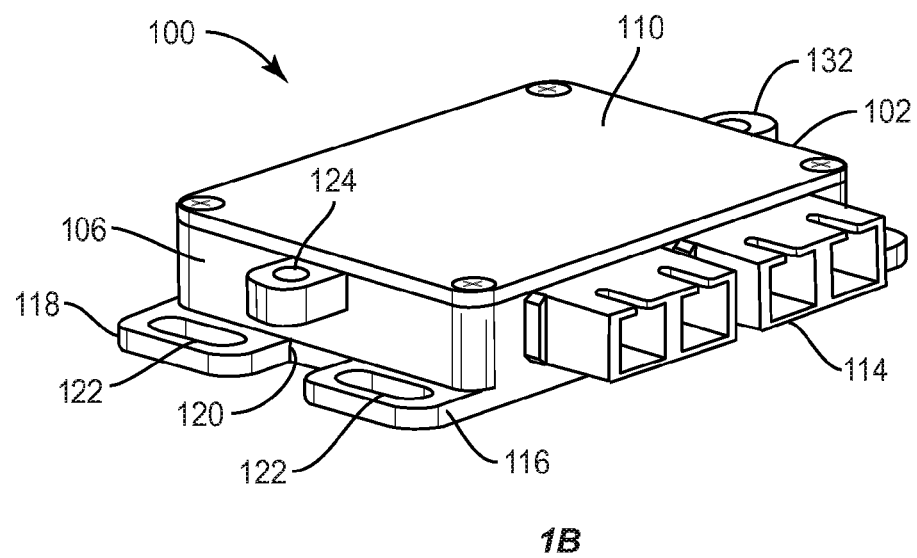
Figure 2:
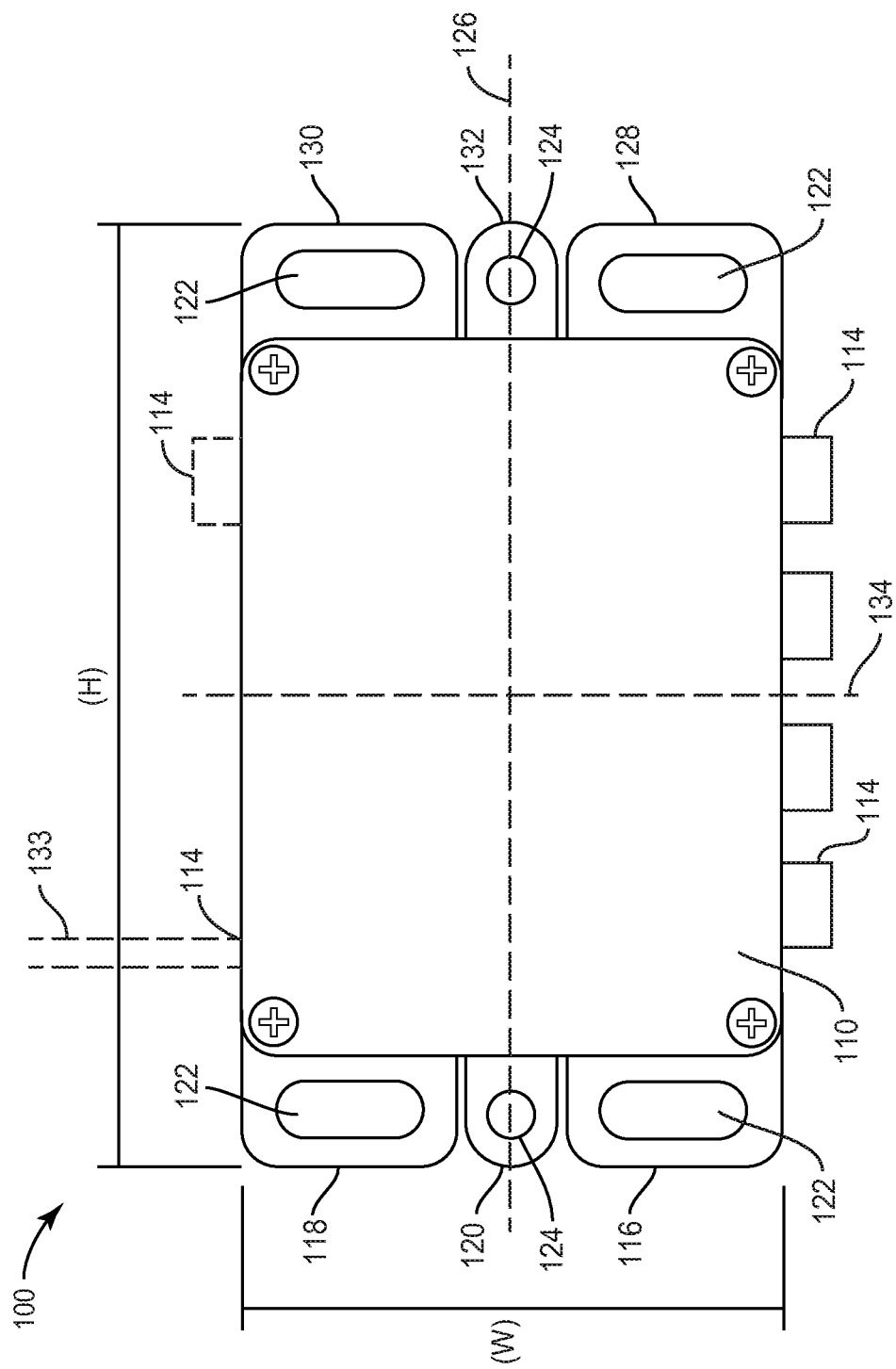
FIG. 2 depicts the fiber optic hardware module of FIG. 1 from a plan view perspective, according to an embodiment.
Figure 3:
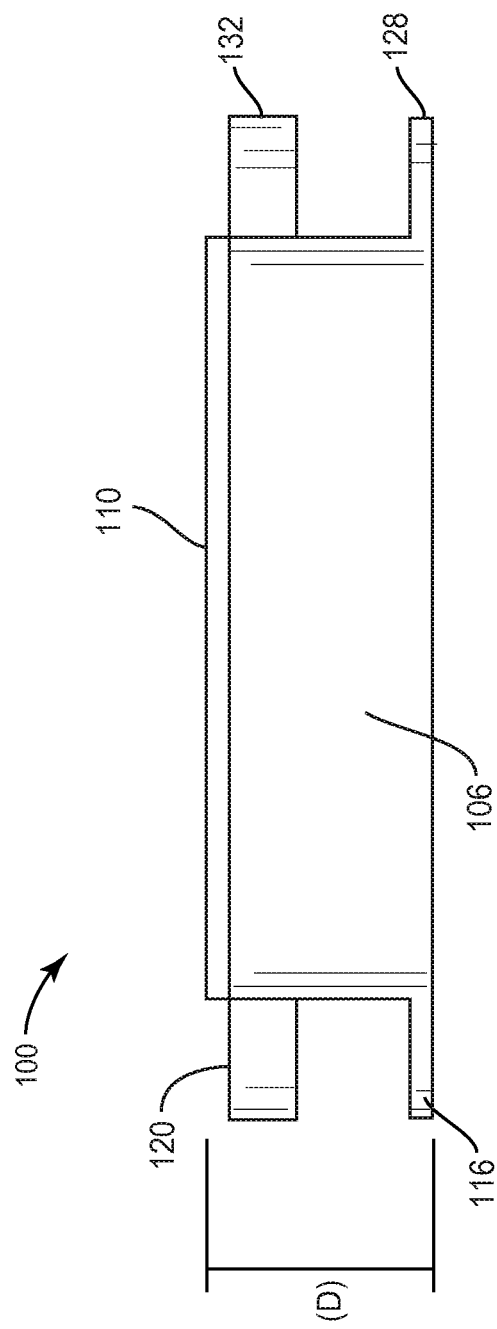
FIG. 3 depicts the fiber optic hardware module of FIG. 1 from a side view perspective, according to an embodiment.

Referring to FIGS. 1-3, a fiber optic hardware module 100 is depicted. The fiber optic hardware module 100 includes an enclosure 102 for storing hardware. The enclosure 102 may store one or more passive optical circuits, for example. The enclosure 102 includes a substantially planar floor section 104. Outer sidewalls 106 adjoin and extend away from the floor section 104. According to an embodiment, the outer sidewalls 106 are perpendicular to the floor section 104. The outer sidewalls 106 extend from the floor section 104 to top edges 108 that are opposite from the floor section 104. The enclosure 102 further includes a detachable top panel 110 that is configured to be fixedly attached to the top edges 108 of the outer sidewalls 106. FIG. 1A depicts the detachable top panel 110 removed from the enclosure 102 and FIG. 1B depicts the detachable top panel 110 fixedly attached to the enclosure 102, according to an embodiment. The detachable top panel 110 may be fixedly attached to the top edges 108 by a plurality of screws extending through the detachable top panel 110 and the outer sidewalls 106. According to another embodiment, the detachable top panel 110 is configured to snap in with the outer sidewalls 106 without screws.

When the detachable top panel 110 is fixedly attached to the top edges 108 of the outer sidewalls 106, it covers an interior volume 112 of the enclosure 102. The interior volume 112 of the enclosure 102 encompasses the three dimensional region that is defined by the floor section 104 and the outer sidewalls 106. The detachable top panel 110 has a sufficiently large area to cover the perimeter formed by the top edges 108 of the outer sidewalls 106. The enclosure 102 is dimensioned such that the interior volume 112 can accommodate at least one item of fiber optic hardware, such as a passive optic circuit. According to an embodiment, a height (H) of the fiber optic hardware module 100 (as shown in FIG. 2) is 72 mm (millimeters), a width (W) of the fiber optic hardware module 100 (as shown in FIG. 2) is 70 mm, and a depth (D) of the of the fiber optic hardware module 100 (as shown in FIG. 3) is 14 mm, with the floor section 104, outer sidewalls 106 and detachable top panel 110 each having a thickness of approximately 1 mm. This provides an interior volume 112 that is sufficiently large to accommodate and enclose a two channel CWDM DEMUX passive optic circuit. This is just one example of a wide variety of dimensioning options for the fiber optic hardware module 100. The dimensions of the enclosure 102 can be tailored to the size of a particular optical circuit or circuits.

In the embodiment of FIG. 1, the enclosure 102 has a cubic configuration. That is, the floor section 104 is rectangular shaped and the enclosure 102 includes four of the outer sidewalls 106 adjoining the perimeter of the rectangle, with the outer sidewalls 106 each being perpendicular to one another and to the floor section 104. Alternatively, the floor section 104 may have any of a variety of geometries such as a circle, triangle, polygon, etc., and the outer sidewalls 106 may extend from the perimeter of any one of these shapes.

The fiber optic hardware module 100 further includes fiber optic cable ports 114 feeding into the interior volume 112. The fiber optic cable ports 114 provide a conduit and connection point between fiber optic circuitry that is stored within the interior volume 112 and fiber optic cabling that is external to the fiber optic hardware module 100. The fiber optic cable ports 114 may be dimensioned to receive a standardized fiber optical connector such as an SC connector, LC connector, pigtail connector, etc. The fiber optic cable ports 114 are disposed on a first one of the outer sidewalls 106.

The fiber optic hardware module 100 further includes first, second and third mounting tabs 116, 118, 120 disposed on a second one of the outer sidewalls 106. In an embodiment in which the enclosure 102 is rectangular, the first, second and third mounting tabs 116, 118, 120 are disposed on a sidewall 106 that is perpendicular to the first sidewall 106 that includes the fiber optic cable ports 114. The first, second and third mounting tabs 116, 118, 120 are substantially flat surfaces that extend away from the second outer sidewall 106 in a direction that is substantially parallel to the floor section 104. The first, second and third mounting tabs 116, 118, 120 have sufficient thickness and size to provide a secure attachment point for the enclosure 102. For example, the first, second and third mounting tabs 116, 118, 120 may each be approximately 1 mm thick.

The first, second and third mounting tabs 116, 118, 120 are each configured to receive a fastener and secure the fiber optic hardware module 100 to a planar surface that is flush against the enclosure 102 by this fastener. More particularly, the first and second mounting tabs 116, 118 are each configured to receive a fastener and secure the fiber optic hardware module 100 to a planar surface that is flush against the floor section 104. The third mounting tab 120 is configured to receive a fastener and secure the fiber optic hardware module 100 to a planar surface that is flush against the detachable top panel 110. According to an embodiment, the first, second and third mounting tabs 116, 118, 120 may each include perforations that are dimensioned to receive a circular fastener, such as a screw, pin, bolt, etc., with the circular fastener extending through one of the first, second and third mounting tabs 116, 118, 120. Alternatively, the first, second and third mounting tabs 116, 118, 120 may include push pins or snap in features that can secure the fiber optic hardware module 100 to another structure.

According to an embodiment, the first and second mounting tabs 116, 118 each include a first fastener perforation 122 that is elongated. That is, the first fastener perforation 122 is non-circular with a length exceeding a width. As shown in FIGS. 1-3, the first fastener perforations 122 of the first and second mounting tabs 116, 118 each include two half-circle shaped edges that are separated by linear edge sections. The width of the first fastener perforation 122 (i.e., the distance between the linear edge sections) may correspond to a diameter of a particular circular fastener so as to allow the circular fastener to be tightly secured within the first fastener perforation 122. The elongated geometry of the first fastener perforation 122 provides lateral flexibility such that the circular fastener can be inserted and tightened at any of a variety of lateral positions within the first fastener perforation 122.

According to an embodiment, the third mounting tabs 120 include a second fastener perforation 124 that is differently dimensioned than the first fastener perforation 122. For example, the second fastener perforation 124 may be circular. The diameter of the second fastener perforation 124 may correspond to the width of the first fastener perforation 122. Thus, the second fastener perforation 124 can receive the same kind of fastener as the first fastener perforation 122, but does not provide a corresponding lateral flexibility as to the location of the fastener.

According to an embodiment, the third mounting tab 120 is vertically offset from the first and second mounting tabs 116, 118. In this configuration, the third mounting tab 120 is disposed along a different plane than the first and second mounting tabs 116, 118 in the depth direction (D) of the fiber optic hardware module 100 such that the first and second mounting tabs 116, 118 are separated from the third mounting tab 120 at least in the depth direction (D). For example, the first and second mounting tabs 116, 118 may be coplanar with the floor section 104 (and with one another) whereas the third mounting tab 120 may be coplanar with the top edges 108 of the outer sidewalls 106. Further, lower surfaces of the first and second mounting tabs 116, 118 may be coplanar with a lower side the floor section 104. This configuration maintains a single plane on the lower side of the enclosure 102 that can be placed flush against another planar surface. Similarly, an upper surface of the third mounting tab 120 may be coplanar with the top edges 108 of the outer sidewalls 106. This allows the upper side of the enclosure 102 to be placed flush against another planar surface.

According to an embodiment, the third mounting tab 120 is laterally offset from the first and second mounting tabs 116, 118. In this configuration, the third mounting tab 120 is spaced apart from the first and second mounting tabs 116, 118 in a lateral direction of the fiber optic hardware module 100 that is parallel to the outer sidewall 106 from which the first, second and third mounting tabs 116, 118 and 120 extend from (e.g., the second outer sidewall 106). For example, as shown from the plan-view perspective of FIG. 2, the third mounting tab 120 is laterally arranged between the first and second mounting tabs 116, 118. This arrangement allows both of the first fastener perforations 122 from the first and second mounting tabs 116, 118 and the second fastener perforations 124 to be accessible from above the fiber optic hardware module 100. According to an embodiment, the second fastener perforation 124 is laterally equidistant to the first fastener perforations 122 of the first and second mounting tabs 116, 118. That is, a center to center spacing measured in the lateral direction as between the second fastener perforation 124 and either one of the first fastener perforations 122 of the first and second mounting tabs 116, 118 is the same.

According to an embodiment, the fiber optic hardware module 100 is symmetrical with respect to a center line 126 that is parallel to the floor section 104 and extends through a center of the second fastener perforation 124. That is, the first, second and third mounting tabs 116, 118, 120 form a mirror image of one another along a laterally dividing center line 126 when the fiber optic hardware module 100 is viewed direction from above (i.e., in the plan-view perspective of FIG. 2).

According to an embodiment, the module includes fourth, fifth and sixth mounting tabs 128, 130, 132 extending away from a third one of the outer sidewalls 106. The third outer sidewall 106 is opposite from the second outer sidewall 106 from which the first, second and third mounting tabs 116, 118, 120 are disposed on. For example, in an embodiment in which the enclosure 102 is rectangular, the second and third outer sidewalls 106 may be the two shorter sides of the enclosure 102 that are perpendicular to an elongated outer sidewall 106 of the enclosure 102 that includes the fiber optic cable ports 114.

The fourth, fifth and sixth mounting tabs 128, 130, 132 may each be configured to receive a fastener and secure the fiber optic hardware module 100 to a planar structure that is flush against the enclosure 102 in a similar manner as previously discussed with reference to the first, second and third mounting tabs 116, 118, 120. According to an embodiment, the fourth, fifth and sixth mounting tabs 128, 130, 132 are substantially identically configured as the first, second and third mounting tabs 116, 118, 120. That is, the fourth and fifth mounting tabs 116, 118 each have a substantially identical geometry as the first and second mounting tabs 116, 118, and each include one of the first fastener perforations 122 with the previously discussed geometry. Likewise, the sixth mounting tab 132 may be substantially identical to the third mounting tab 120 with an identically shaped second fastener perforation 124.

According to an embodiment, the fiber optic hardware module 100 is symmetrical with respect to a center line 134 that is parallel to the floor section 104 and the second and third outer sidewalls 106. In this embodiment, the first, second and third mounting tabs 116, 118, 120 form a mirror image with the fourth, fifth and sixth mounting tabs 128, 130, 132, relative to the center line 134 that divides the fiber optic hardware module 100 in half when viewed from above (i.e., in the plan-view perspective of FIG. 2).

As shown in FIG. 2, the location of the fiber optic cable ports 114 may vary. For example, in an embodiment in which the fiber optic hardware module 100 is rectangular, the fiber optic cable ports 114 can be disposed on either one or both of the outer sidewalls 106 that is perpendicular to the outer sidewalls 106 upon which the first, second and third mounting tabs 116, 118, 120 are disposed. In this way, the fiber optic hardware module 100 can be suited to a variety of applications where access to the fiber optic cable ports 114 may be impeded by an adjacent structure. Furthermore, instead of using a standardized fiber optical connector such as an SC connector, LC connector for the fiber optic cable ports 114, a fiber optic cable 133 (e.g., pigtail cabling) can be fed directly into a fiber optic cable port 114 that is tailored to the diameter of the fiber optic cable 133.

FIGS. 4-8 depict various assemblies 200 with at least one of the fiber optic hardware modules 100 as described with reference to FIGS. 1-3 being secured a second fiber optic hardware device. In each case, the second fiber optic hardware device includes a planar mounting surface and at least one fastener perforation being configured to receive a circular fastener (e.g., a screw). The fiber optic hardware module 100 is secured to the second fiber optic hardware device by a fastener extending through at least one of the first, second and third mounting tabs 116, 118, 120 and through one of the fastener perforations of the additional fiber optic hardware device.

Figure 4:
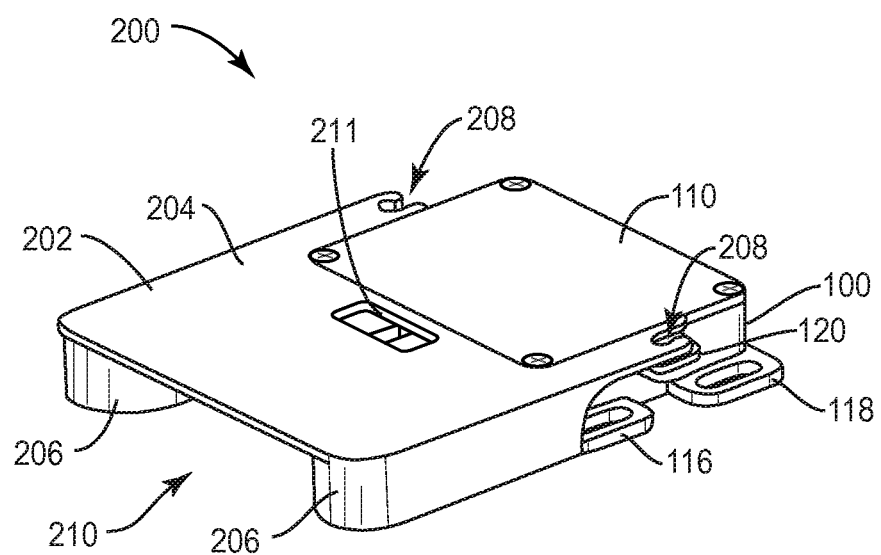
FIG. 4 depicts an assembly with a shroud placed around a fiber optic hardware module, according to an embodiment.

Referring to FIG. 4, an assembly 200 with one of the fiber optic hardware modules 100 and a protective shroud 202 is depicted. The protective shroud 202 has been placed around the fiber optic hardware module 100. In this assembly 200, the detachable top panel 110 of the fiber optic hardware module 100 has been fixedly attached to the enclosure 102 in the manner shown and discussed with reference to FIG. 1B.

The protective shroud 202 includes a planar roof section 204, a pair of curved sidewalls 206, and a pair of shroud fastener perforations 208. When the protective shroud 202 is placed around the fiber optic hardware module 100 in the manner depicted in FIG. 4, the roof section 204 is coplanar with the detachable top panel 110 and extends over the fiber optic cable ports 114. The curved sidewalls 206 extend away from the roof section 204 and may be perpendicular to the roof section 204. The fiber optic cable ports 114 are accessible at an entrance 210 that is between the curved sidewalls 206. Thus, while the planar roof section 204 covers the fiber optic cable ports 114 when the protective shroud 202 is placed around the fiber optic hardware module 100, fiber optic cabling can nonetheless be connected to the fiber optic cable ports 114 via the entrance 210.

The pair of shroud fastener perforations 208 may be coplanar with the roof section 204. For example, as shown in the embodiment of FIG. 4, the shroud fastener perforations 208 are disposed on protrusions that are adjacent to and coplanar with the roof section 204. The shroud fastener perforations 208 align with second fastener perforations 124 of the third and sixth mounting tabs 120, 132 when the protective shroud 202 is placed around the fiber optic hardware module 100 in the manner depicted in FIG. 4. Thus, the protective shroud 202 can be affixed to the fiber optic hardware module 100 by circular fasteners (e.g., screws) extending through the third and sixth mounting tabs 120, 132.

The protective shroud 202 advantageously covers and protects the fiber optic cable ports 114 without increasing the vertical profile of the assembly 200. Thus, the fiber optic hardware module 100 with the protective shroud 202 affixed thereto can be mounted flush against other planar surfaces using the mounting tabs in the manner previously discussed.

The depicted configuration of the shroud fastener perforations 208 is one example of a variety of connection mechanisms that may be used to affix the protective shroud 202 to the fiber optic hardware module 100. For example, the protrusions of the protective shroud 202 may form a hinge mechanism with the third and sixth mounting tabs 120, 132. This hinge mechanism allows the protective shroud 202 to be pivoted around the fiber optic hardware module 100 so as to completely expose the fiber optic cable ports 114.

According to an embodiment, the protective shroud 202 includes a window section 211 disposed on the roof section 204. This window section 211 allows an installer to access the fiber optic cable ports 114 and associated fiber optic cabling feeding into the fiber optic cable ports 114 when the protective shroud 202 is placed around the fiber optic hardware module 100.

Figure 5:
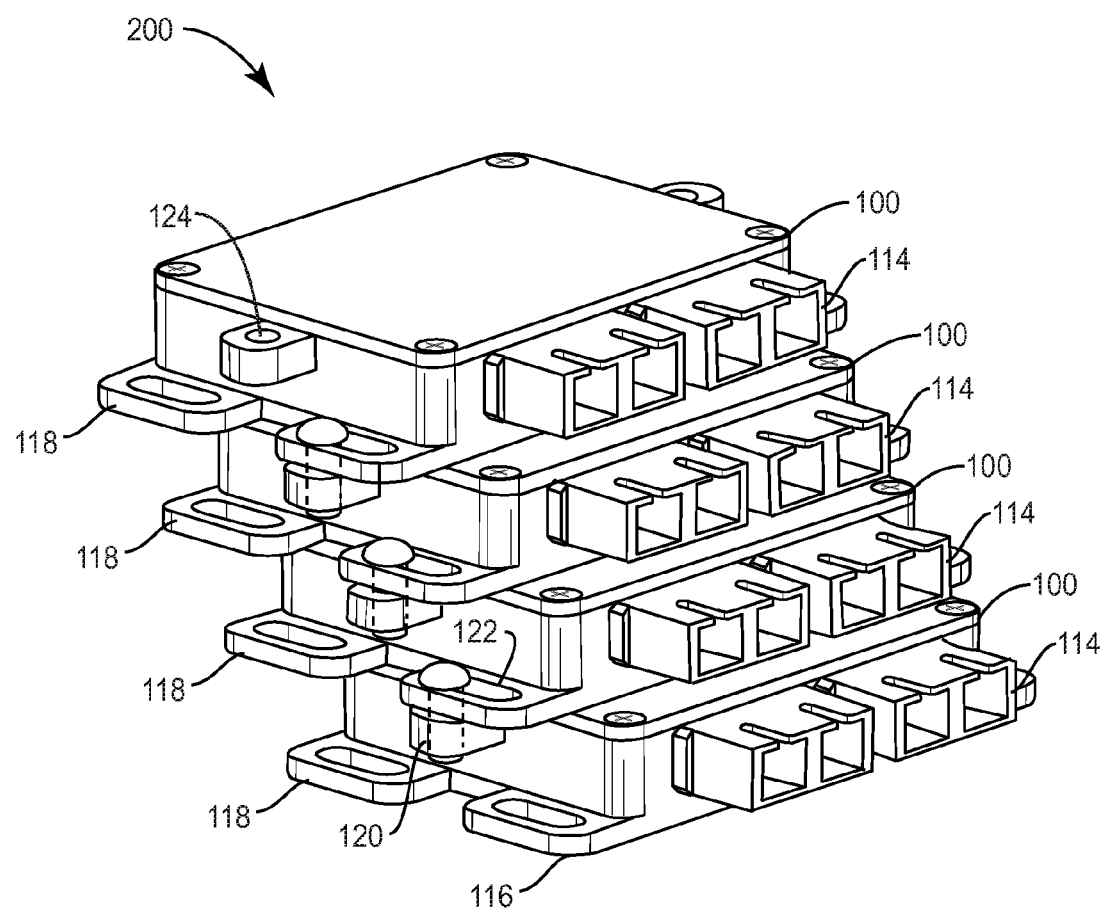
FIG. 5 depicts an assembly with a plurality of fiber optic hardware modules stacked on top of one another, according to an embodiment.

Referring to FIG. 5, an assembly 200 that includes a plurality of identically configured fiber optic hardware modules 100 is depicted. Each of the fiber optic hardware modules 100 may be substantially similar or identical to the fiber optic hardware module 100 described with reference to FIGS. 1-3. In the assembly 200 of FIG. 5, the fiber optic hardware modules 100 are layered on top of one another in a staggered configuration. A first one of the fiber optic hardware modules 100 is located at a bottom of the assembly 200. The first fiber optic hardware module 100 may be affixed to a subjacent planar structure (not shown) using any one the first, second, fourth and fifth mounting tabs 118, 120, 128, 130. A second one of the fiber optic hardware modules 100 that is substantially identical to the first fiber optic hardware module 100 is layered on top of the first fiber optic hardware module 100 such that the detachable top panel 110 of the first fiber optic hardware module 100 is flush against the floor section 104 of the second fiber optic hardware module 100.

Due to the advantageous configuration of the first, second, third mounting tabs 116, 118, 120 (and/or fourth, fifth and sixth mounting tabs 128, 130, 132), the second fastener perforation 124 of the third mounting tab 120 can be aligned with either one of the first fastener perforations 122 of the first and second mounting tabs 116, 118 such that the first and second fiber optic hardware modules 100 are laterally staggered. That is, the second fiber optic hardware module 100 can be placed on top the first fiber optic hardware module 100, but laterally shifted (either forwards or backwards) such that the second fastener perforation 124 of the second fiber optic hardware module 100 aligns with one of the first fastener perforations 122 of the first fiber optic hardware module 100. The first and second fiber optic hardware modules 100 can be secured to one another by a circular fastener extending through the second fastener perforation 124 of the first fiber optic hardware module 100 and through one of the first fastener perforations 122 of the second fiber optic hardware module 100. Further, this layering concept can be repeated with any number of the fiber optic hardware modules 100. For instance, as shown in FIG. 5, two more identically configured fiber optic hardware modules 100 are placed on top of the second fiber optic hardware module 100 and staggered in the above described manner. Each one of the fiber optic hardware modules 100 can be secured to one another by a circular fastener extending through the second fastener perforation 124 of the lower one of the fiber optic hardware modules 100 and through one of the first fastener perforations 122 of the upper adjacent fiber optic hardware module 100.

The staggered alignment of the fiber optic hardware modules 100 advantageously uncovers each of the fiber optic cable ports 114 from the immediately adjacent fiber optic hardware module 100. Thus, an installer can use a large number of the fiber optic hardware modules 100 together to secure and store a number of optical circuits with easy access to all of the fiber optic cable ports 114 for each fiber optic hardware module 100.

Figure 6:
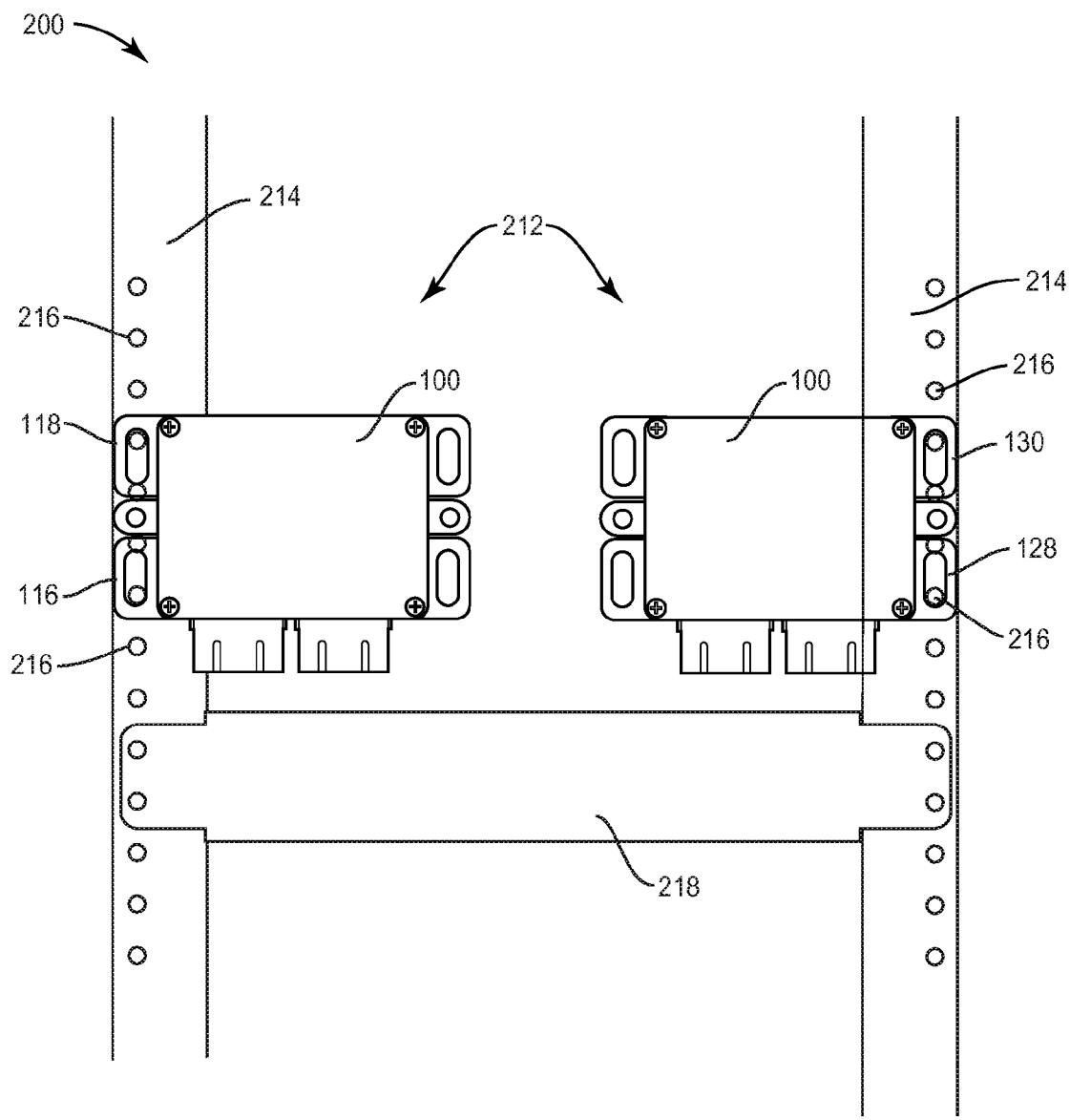
FIG. 6 depicts an assembly with a fiber optic hardware module secured to the mounting rails of a telecommunications rack, according to an embodiment.

Referring to FIG. 6, a fiber optic assembly 200 is depicted, according to another embodiment. In the assembly 200 of FIG. 6, the fiber optic hardware module 100 is secured to a fiber optic equipment rack 212. The fiber optic equipment rack 212 includes two mounting rails 214 that are spaced apart from one another. The mounting rails 214 include regularly spaced apart rail fastener perforations 216. The spacing between the rail fastener perforations 216 may conform to an industry standard. For example, according to one industry standard, the center to center spacing of the rail fastener perforations 216 is approximately 1.25" for two consecutive rail fastener perforations 216, followed by a center to center spacing of approximately 0.5" for the immediately rail adjacent rail fastener perforation 216, followed by a center to center spacing of approximately 1.25" for two consecutive rail fastener perforations 216, and so forth. The fiber optic equipment rack 212 is configured to accommodate fiber optic equipment, such a fiber optic shelf 218 that is secured to the mounting rails with by fasteners extending through the rail fastener perforations 216.

In the depicted assembly 200, the fiber optic hardware module 100 is secured to the rail fastener perforations 216 using the first and second mounting tabs 116, 118 or the fifth and sixth mounting tabs. As shown on the left side of FIG. 6, a fiber optic hardware module 100 can be secured to the leftmost mounting rail 214 by circular fasteners extending through the first and second mounting tabs 116, 118 and through first and second rail fastener perforations 216 of the leftmost mounting rail 214. Further, as shown on the right side of FIG. 6, the fiber optic hardware module 100 can be secured to the rightmost mounting rail 214 by circular fasteners extending through the fourth and fifth mounting tabs 128, 130 and through first and second rail fastener perforations 216 of the rightmost mounting rail 214.

The fastener perforations of the fiber optic hardware module 100 are advantageously configured to be compatible with the rail fastener perforations 216 of the fiber optic equipment rack 212. For example, according to an embodiment, the half-circle shaped edge of the first fastener perforation 122 on the first mounting tab 116 aligns with a first rail fastener perforation 216 of the fiber optic equipment rack 212 and an opposite facing half-circle shaped edge of the first fastener perforation 122 on the second mounting tab 118 aligns with a second rail fastener perforation 216 of the fiber optic equipment rack 212. That is, the dimensioning of the first fastener perforations 122 of the first and second mounting tabs 116, 118 is corresponded to the regular spacing of the rail fastener perforations 216 (e.g., to a center to center spacing of 1.25") such that two circular fasteners can be flush against the half-circle shaped edges of the first and second mounting tabs 116, 118 while extending through the first and second rail fastener perforations 216.

Figure 7:
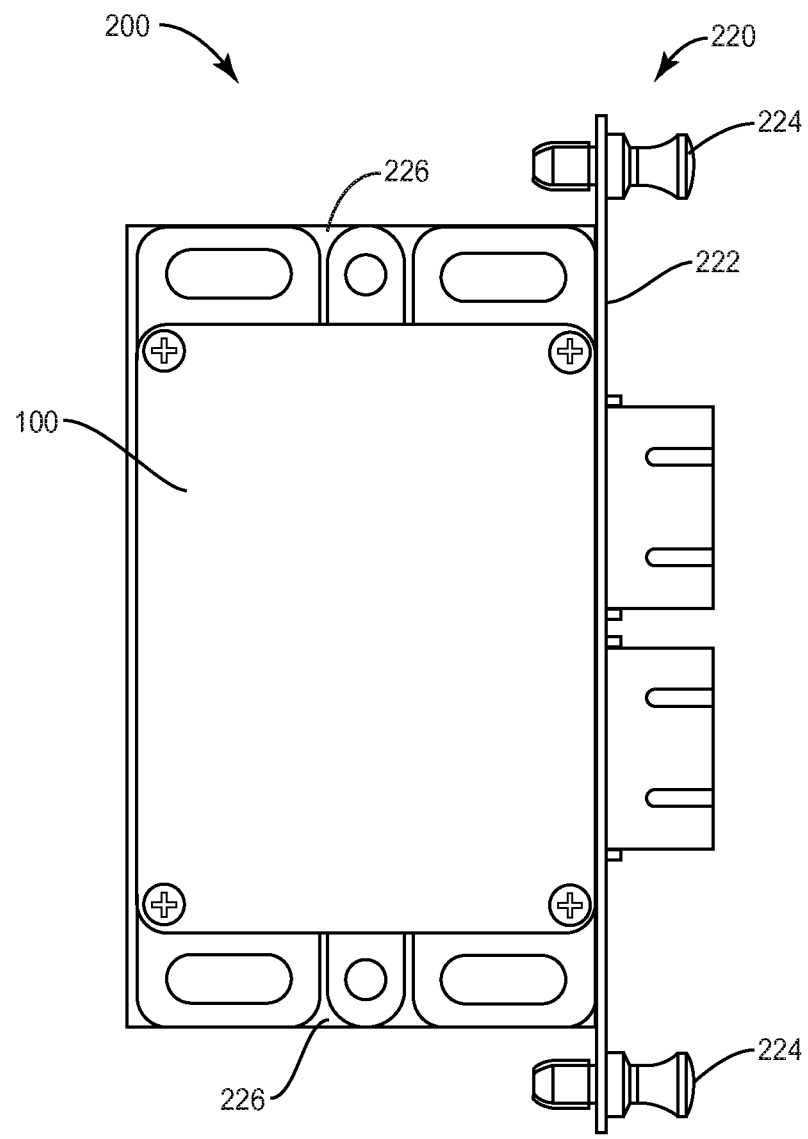
FIG. 7 depicts an assembly with a fiber optic hardware module secured to a mounting bracket, according to an embodiment.

Referring to FIG. 7, a fiber optic assembly 200 is depicted, according to another embodiment. In the embodiment of FIG. 7, the fiber optic hardware module 100 is secured to a mounting bracket 220. The mounting bracket 220 may be specially configured to secure the fiber optic hardware module 100 to another apparatus, such as a fiber optic cassette shelf. According to an embodiment, the mounting bracket 220 includes a front panel 222 with two spaced apart push pins 224. The mounting bracket 220 includes a mounting surface 226 extending away from the front panel 222. When the fiber optic hardware module 100 is secured to the mounting bracket 220, the floor section 104 of the fiber optic hardware module 100 is flush against the mounting surface 226. The fiber optic hardware module 100 may be secured to the mounting bracket 220 by a circular fastener extending through any one of the first, second, third, fourth, fifth and sixth mounting tabs 116, 118, 120, 128, 130, 132. The mounting bracket 220 may include threaded receptacles that can be arranged underneath any one of the fastener perforations of the fiber optic hardware module 100. These threaded receptacles can be arranged on the same side of the mounting surface 226 as the fiber optic hardware module 100. This configuration of the threaded receptacles allows the fiber optic hardware module 100 to be secured to the mounting bracket 220 without the fasteners penetrating through the mounting surface 226.

Figure 8:
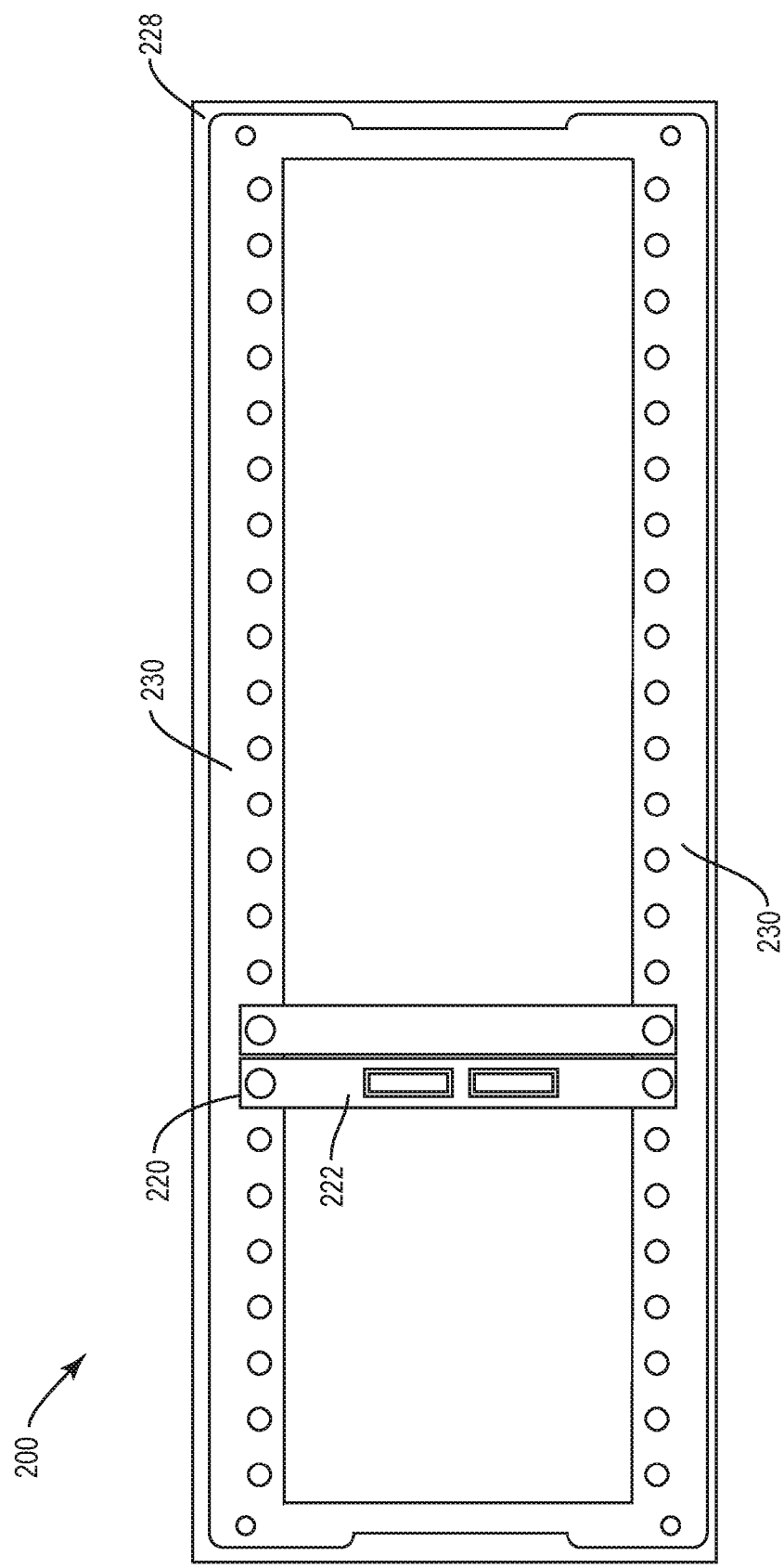
FIG. 8 depicts an assembly with fiber optic hardware module secured to a mounting bracket and the mounting bracket being secured to a fiber optic cassette shelf, according to an embodiment.

Referring to FIG. 8, one of the mounting brackets 220 with the fiber optic hardware module 100 affixed thereto is secured to a fiber optic cassette shelf 228. The fiber optic cassette shelf 228 is configured to accommodate a number of fiber optic cassettes, such as LGX cassettes. The fiber optic cassette shelf 228 includes at least two cassette rails 230 that are spaced apart from one another by a distance correlating to a height of a particular fiber optic cassette. The mounting bracket 220 is secured to the two spaced apart cassette rails 230 by the push pins 224. The mounting bracket 220 allows one of the fiber optic hardware modules 100 to occupy one of the slots in the fiber optic cassette shelf 228 alongside an adjacent fiber optic cassette. Thus, the fiber optic hardware module 100 can be used to store and secure an optical circuit and corresponding fiber optic cabling within the cassette shelf 228 in a space efficient manner.

The symmetry of the fiber optic hardware module 100 advantageously provides flexibility to installers with respect to how and where the fiber optic hardware module 100 can be secured to another structure. Either side of the fiber optic hardware module 100 can be used to secure the fiber optic hardware module 100 to another structure (e.g., as shown in FIG. 6). Further, the staggering of the fiber optic hardware modules 100 (e.g., the arrangement of FIG. 3) can be done in two different directions, as the symmetry of the first and second mounting tabs 116, 118 allows either one of the first and second mounting tabs 116, 118 to align with the third mounting tab 120 of the immediately adjacent fiber optic hardware module 100.

The term "substantially" encompasses absolute conformity with a requirement as well as minor deviation from absolute conformity with the requirement due to manufacturing process variations, assembly, and other factors that may cause a deviation from the ideal. Provided that the deviations are not significant enough to prevent the structure from being assembled in the manner described herein (e.g., the staggered configuration of fiber optic hardware module 100 shown in FIG. 3), the term "substantially" encompasses any of these deviations.

Spatially relative terms such as "under," "below," "lower," "over," "upper," "top," bottom" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:
1. A fiber optic hardware module, comprising:
an enclosure, comprising:
a substantially planar floor section;
outer sidewalls adjoining the floor section and extending away from the floor section to top edges; and
a detachable top panel that covers an interior volume, the interior volume being defined by the outer sidewalls and the floor section;
fiber optic cable ports disposed on a first one of the outer sidewalls and feeding into the interior volume; and
first, second and third mounting tabs extending away from a second one of the outer sidewalls;

wherein the first and second mounting tabs are each configured to receive a fastener and secure the fiber optic hardware module to a planar surface that is flush against the floor section, wherein the third mounting tab is configured to receive a fastener and secure the fiber optic hardware module to a planar surface that is flush against the top panel, wherein the third mounting tab is vertically offset from the first and second mounting tabs, and wherein the third mounting tab is laterally between the first and second mounting tabs.

2. The module of claim 1, wherein the first and second mounting tabs each comprise a first fastener perforation, the first fastener perforation being elongated with a length that exceeds a width, wherein the third mounting tab comprises a second fastener perforation, the second fastener perforation being circular with a diameter corresponding to the width of the first fastener perforation.

3. The module of claim 2, wherein the first and second mounting tabs are coplanar with one another, and wherein the second fastener perforation is laterally equidistant to the first fastener perforations of the first and second mounting tabs.

4. The module of claim 3, wherein the first, second and third mounting tabs are symmetrical with respect to a center line that is parallel to the floor section and extends through a center of the second fastener perforation.

5. The module of claim 4, further comprising:
fourth, fifth and sixth mounting tabs extending away from a third one of the outer sidewalls, the third outer sidewall being opposite from the second outer sidewall,
wherein the fourth, fifth and sixth mounting tabs are each configured to receive a fastener and secure the fiber optic hardware module to a planar surface that is flush against the enclosure.

6. The module of claim 5, wherein the fourth, fifth and sixth mounting tabs are identically configured as the first, second and third mounting tabs, and wherein the fiber optic hardware module is symmetrical with respect to a center line that is parallel to the floor section and the second and third outer sidewalls.

7. The module of claim 5, wherein the floor section is rectangular shaped, wherein the enclosure comprises four of the outer sidewalls, wherein the first outer sidewall adjoins and is perpendicular to the second and third outer sidewalls, wherein a fourth outer sidewalls adjoins and is perpendicular to the second and third outer sidewalls, and wherein the fiber optic cable ports are disposed on the first and fourth outer sidewalls.

8. The module of claim 1, wherein the first and second mounting tabs comprise lower surfaces that are coplanar with a lower side of the floor section, and wherein the third mounting tabs comprise an upper surface that is coplanar with the top edges of the outer sidewalls.

9. An assembly, comprising:
a first fiber optic hardware module, comprising:
an enclosure, comprising:
a substantially planar floor section;
outer sidewalls adjoining the floor section and extending away from the floor section to top edges;
a detachable top panel that is fixedly attached to the top edges of the outer sidewalls and cover an interior volume defined by the outer sidewalls and the floor section;
fiber optic cable ports disposed on a first one of the outer sidewalls and feeding into the interior volume;
first, second and third mounting tabs extending away from a second one of the outer sidewalls; and wherein the third mounting tab is vertically offset from the first and second mounting tabs, and
wherein the third mounting tab is laterally between the first and second mounting tabs;
a second fiber optic hardware device comprising a planar mounting surface;
wherein the first fiber optic hardware module is flush against the planar mounting surface of the second fiber optic hardware device, and
wherein the second fiber optic hardware device is secured to the first fiber optic hardware module at one of the first, second and third mounting tabs.

10. The assembly of claim 9, wherein the second fiber optic hardware device comprises at least one fastener perforation, and wherein the second fiber optic hardware device is secured to the second fiber optic hardware device by a fastener extending through one of the first, second and third mounting tabs and one of the fastener perforations of the second fiber optic hardware device.

11. The assembly of claim 10, wherein the second fiber optic hardware device is a protective shroud, comprising:
a planar roof section;
a pair of curved sidewalls extending away from the roof section; and
a pair of fastener perforations that are coplanar with the roof section,
wherein the shroud is placed around the enclosure such that the roof section is coplanar with the top pane, such that the pair of fastener perforations of the shroud align with fastener perforations of the third and sixth mounting tabs, and such that the fiber optic cable ports are accessible through an entrance of the shroud that is between the pair of curved sidewalls.

12. The assembly of claim 10, wherein the second fiber optic hardware device is a second one of the fiber optic hardware modules that is substantially identical to the first fiber optic hardware module, and wherein the top panel of the first fiber optic hardware module is flush against the floor section of the second fiber optic hardware module.

13. The assembly of claim 12, wherein the first and second mounting tabs of the first and second fiber optic hardware modules each comprise a first fastener perforation, the first fastener perforation being elongated with a length that exceeds a width, wherein the third mounting tabs of the first and second fiber optic hardware modules each comprise a second fastener perforation, the second fastener perforation being circular with a diameter corresponding to the width of the first fastener perforation, wherein the first fiber optic hardware module is secured to the second fiber optic hardware module by a first fastener extending through the second fastener perforation of the first fiber optic hardware module and through one of the first fastener perforations of the second fiber optic hardware module.

14. The assembly of claim 13, further comprising a plurality of the fiber optic hardware modules secured the second fiber optic hardware modules, each of the fiber optic hardware modules in the plurality being substantially identical to the first and second fiber optic hardware modules, wherein each of the fiber optic hardware modules are secured to one another by a second fastener extending through the second fastener perforation of one of the fiber optic hardware modules and through one of the first fastener perforations of an immediately adjacent fiber optic hardware module.

15. The assembly of claim 10, wherein the second fiber optic hardware device is a fiber optic equipment rack, comprising two mounting rails with a plurality of regularly spaced apart fastener perforations, wherein the first and second mounting tabs of the first fiber optic hardware module are flush against one of the mounting rails, and wherein the first fiber optic hardware module is secured to the mounting rail by fasteners extending through the first and second mounting tabs and through first and second fastener perforations of the mounting rail.

16. The assembly of claim 15, wherein the first fastener perforations of the first and second mounting tabs each comprise two half-circle shaped edges being separated by linear edge sections, wherein the half-circle shaped edge of the first fastener perforation on the first mounting tab aligns with the first fastener perforation of the mounting rail, and wherein an opposite facing half-circle shaped edge of the first fastener perforation on the second mounting tab aligns with the second fastener perforation of the mounting rail.

17. The assembly of claim 9, wherein the second fiber optic hardware device is a mounting bracket comprising a front panel with two spaced apart push pins and a planar mounting surface extending away from the front panel, wherein the first fiber optic hardware module is flush against the planar mounting surface.

18. The assembly of claim 17, further comprising a fiber optic cassette shelf being configured to accommodate a plurality of fiber optic cassettes and comprising at least two spaced apart cassette rails, and wherein the mounting bracket is secured to the two spaced apart cassette rails by the push pins.

* * * * *